Figure 1:
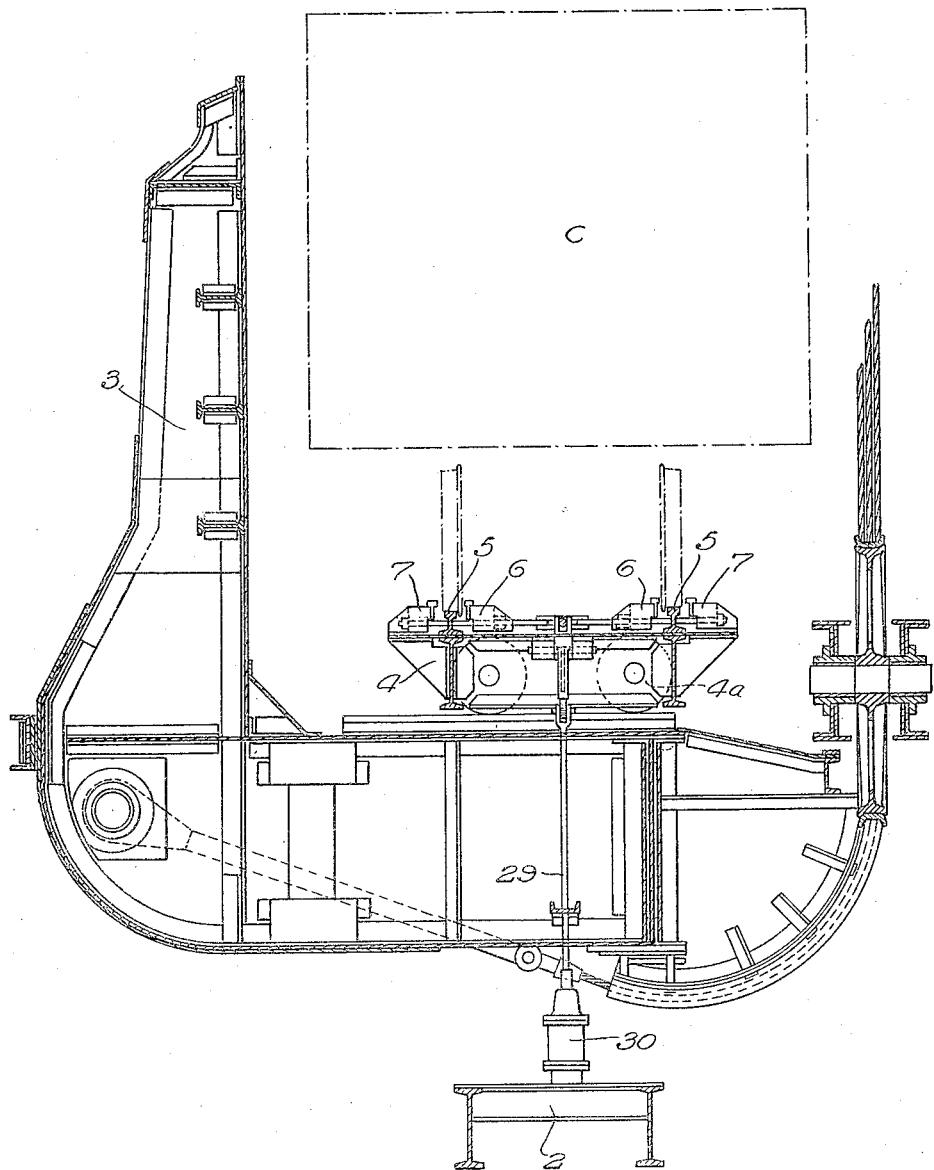

May 2, 1933.  R. M. BICKLEY  1,907,037
CAR RETARDER FOR CAR DUMPERS
Filed May 18, 1929  4 Sheets-Sheet 1

INVENTOR
Ross M. Bickley,
by his Attys,
Byrnes, Stebbins & Parmley

May 2, 1933.  R. M. BICKLEY  1,907,037
CAR RETARDER FOR CAR DUMPERS
Filed May 18, 1929   4 Sheets-Sheet 2

INVENTOR
Ross M. Bickley,
by his attys.

May 2, 1933.  R. M. BICKLEY  1,907,037
CAR RETARDER FOR CAR DUMPERS
Filed May 18, 1929  4 Sheets-Sheet 3
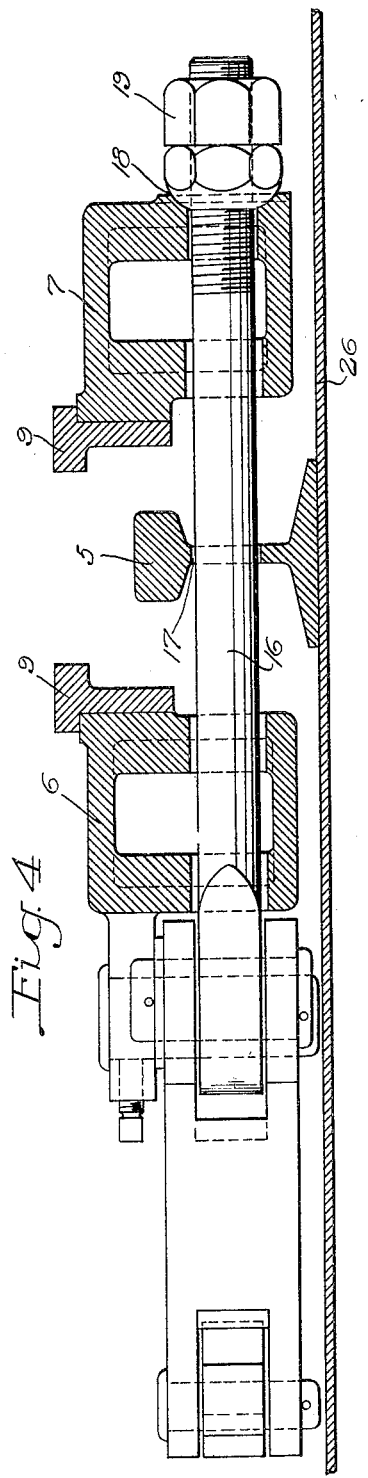
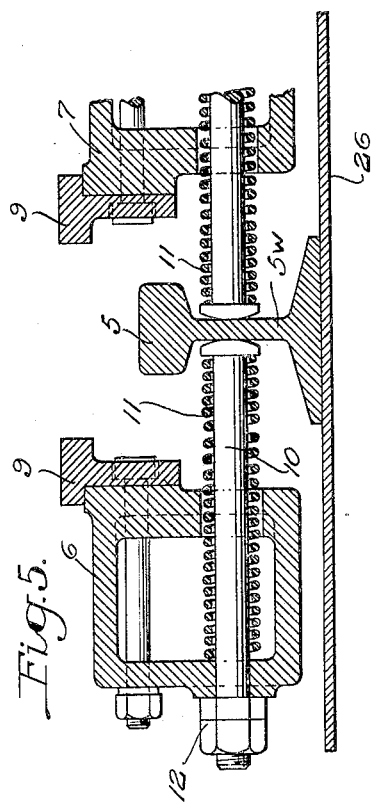
INVENTOR
Ross M. Bickley May 2, 1933.  R. M. BICKLEY  1,907,037
CAR RETARDER FOR CAR DUMPERS
Filed May 18, 1929  4 Sheets-Sheet 4

INVENTOR
Ross M. Bickley,
by his attys,
Byrnes, Stebbins & Parmelee

Patented May 2, 1933

1,907,037

UNITED STATES PATENT OFFICE

ROSS M. BICKLEY, OF PITTSBURGH, PENNSYLVANIA, ASSIGNOR TO HEYL & PATTERSON, INC., OF PITTSBURGH, PENNSYLVANIA, A CORPORATION OF PENNSYLVANIA

CAR RETARDER FOR CAR DUMPERS

Application filed May 18, 1929. Serial No. 364,037.

This invention relates to car retarders for car dumpers and is particularly useful with car dumpers of the lifting and tilting type wherein the car to be dumped is run onto a platen carried by a lifting and tilting cradle.

Car retarders of various sorts have been proposed for freight classification yards on railroads. However, the conditions encountered are radically different from the conditions encountered in a car dumper, and provision for the special factors involved in car dumper design must be made.

In a car dumper the car must be stopped at a definite point (within reasonable limits) so as to properly locate the ends of the car body with respect to the car clamps which hold the car while dumping. In high capacity dumpers the entering cars are moved at such a speed that the amount of energy absorbed by the retarder per foot of travel is very high as compared with the requirements of railroad practice. Ordinarily, at least twice as much energy must be absorbed per foot of travel in a car dumper retarder as in a retarder for railroad service, where the only problem is to reduce the speed of a car coasting down a slight grade to a suitable speed at which it may safely pass over track scales or through switches.

The oncoming loaded car which is to be dumped pushes the last dumped car off the dumper. It is therefore necessary to so arrange the retarder that continuous braking on the front truck of the loaded car can be effected while leaving the rear truck of the empty car entirely free.

The cradle of a car dumper has a vertical travel which in some cases is as much as thirty feet before tilting. It is therefore highly desirable to eliminate any motive means on the cradle proper, for their use involves long loops of air hose or electric cables, which are always undesirable in equipment of this character. Moreover, the car dumper platen provides only a limited amount of space so that it is hardly practical to locate any actuating mechanism thereon.

As above stated, a very high retarding or braking effort must be exerted and it is therefore important that any given retarder shoe shall exert maximum pressure, regardless of the point along its length where it engages the wheel. As the car moves along it will successively engage every point on the face of a retarder shoe from one end to the other, and the actuating mechanism must be such that the pressure applied at any point is the same. This precludes the use of compression springs between the friction shoe and its supporting member. Assume that pressure is applied through compression springs, one at either end of a shoe. When the shoe is engaged by the wheel at one end, only 50% of the total spring pressure is applied thereto. It is only at the middle of the shoe where the entire pressure is applied and the average is only 75% of the possible pressure.

Provision must be made for applying uniform pressure regardless of the difference in width of wheels on the two sides of the same car, or if the car is slightly off center on the track, that is to say, with the flanges tight against one rail and away from the other rail.

In case fluid actuated devices are employed for operating the retarder, the pipes should be of minimum length so as to give quick application and release of pressure. Rapidity of control is important because quick changes in the amount of braking must be made in case it is seen that the car tends to go too far or to stop too soon.

The point of application of pressure to the retarder shoes by the actuating mechanism should be at the minimum possible distance below the elevation of the point of contact with the wheels so as to prevent excessive torsional strain on the shoes and high pressure on the surfaces of the guides.

In order to meet the foregoing requirements I provide a car dumper having a plurality of independently operable car retarding devices therealong. These devices may be sequentially brought into operation as the trucks of the car to be dumped move onto the car dumper cradle. The desired braking effect may thereby be applied to the full car while those retarders lying alongside the truck or trucks of the empty car are left inoperative until the truck of the filled car moves alongside them and is ready to be engaged.

I preferably employ fluid actuated cylinders for operating the several retarding units. Control valves are provided for actuating these cylinders. Such valves take up a great deal of space and in order to bring the controls within a reasonable compass so that they may be handled by one operator, I arrange them in staggered relation. I further provide a common throw-out means whereby all of the retarding units may be moved to non-clamping position.

In order to eliminate the use of flexible hose or the like, I mount the cylinders on the stationary frame of the car dumper and so arrange the operative connections of the retarder units that when the cradle of the car dumper is in car-receiving position, the retarder unit mechanisms are in position to be operatively engaged by the pistons of the cylinders. The platen of a car dumper is arranged to move horizontally on the cradle. I provide vertically rockable levers on the platen, which levers actuate the retarder shoes and which are engageable by push rods in the cradle when the platen is in car-receiving position. The push rods are, in turn, engaged by the piston rods of the fluid cylinders.

As above stated, it is undesirable in a retarder of this character to apply the braking force through springs. I employ positive linkages for actuating the retarder shoes. There is preferably provided a retarder shoe on each side of each rail, the several shoes being all movable toward or away from the rail. Each of the inner shoes is preferably provided adjacent each end with a bell crank lever pivoted onto the shoe and connected by a link to its outer shoe. The several bell crank levers are connected together through equalizers to an actuating rod connected to the vertical rockable lever above referred to.

With this construction movement of the vertically rockable lever imparts equal force to each of the bell crank levers on the inner shoes. Acting through the links, this causes the outer shoes to move inwardly and the inner shoes to move outwardly so as to clamp the car wheels. One hundred percent pressure is applied throughout the length of the retarder shoes and it is immaterial that the wheels on one side are narrower than on the other, or that the car is not centered on its rails.

In order to reduce torsional forces to a minimum, I provide openings in the rails, preferably immediately below the heads thereof, through which the links operate. This materially reduces the torsional force on the shoes and permits of much lighter construction.

Figure 2:
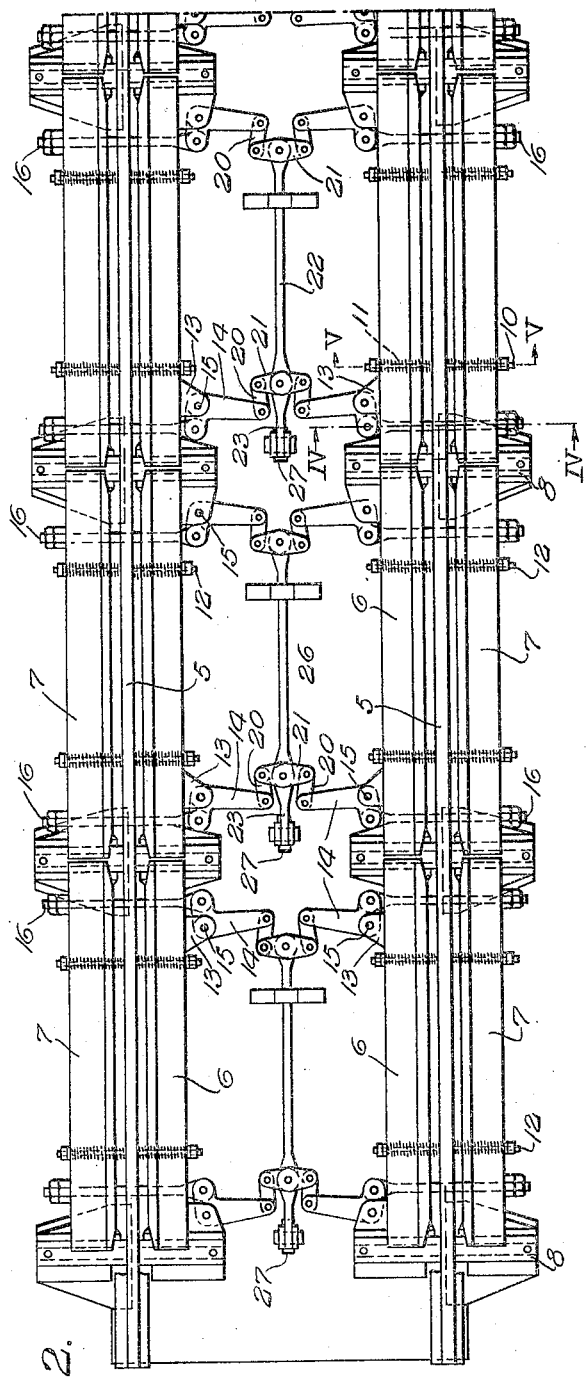
Figure 3:
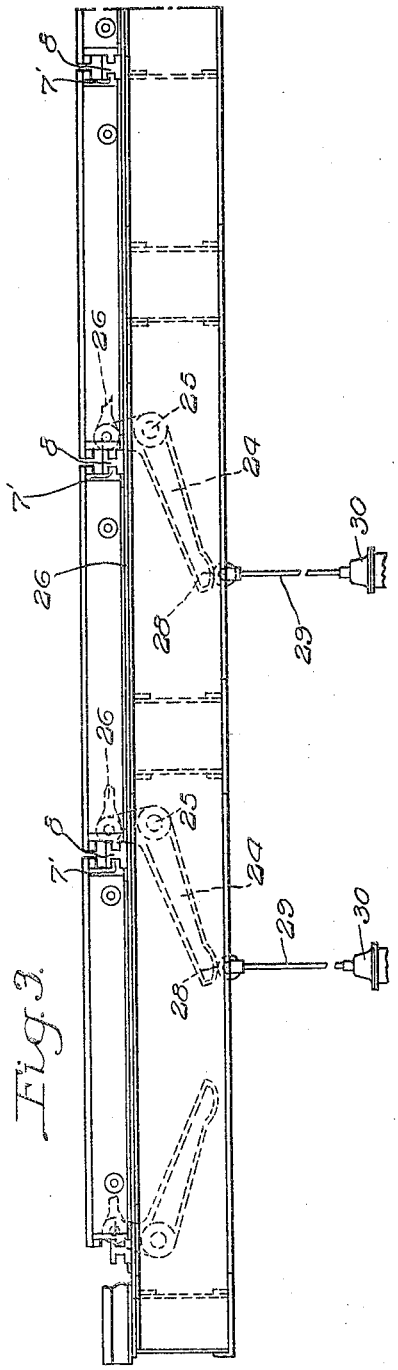
Figure 6:
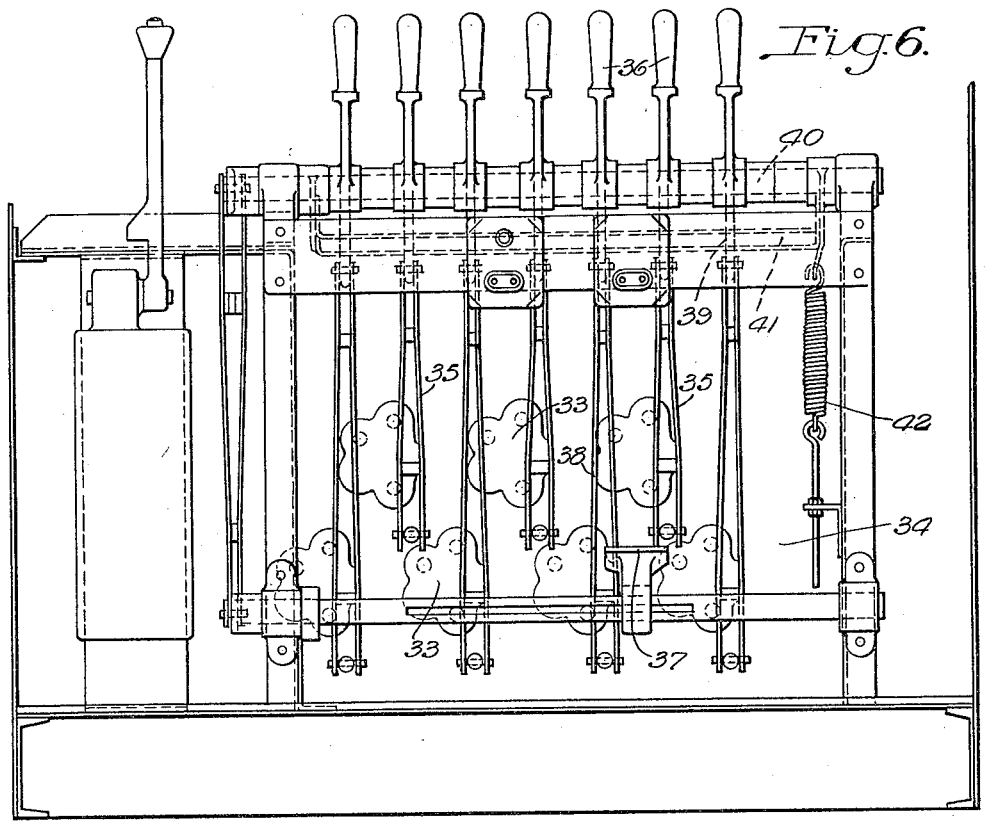
Figure 7:
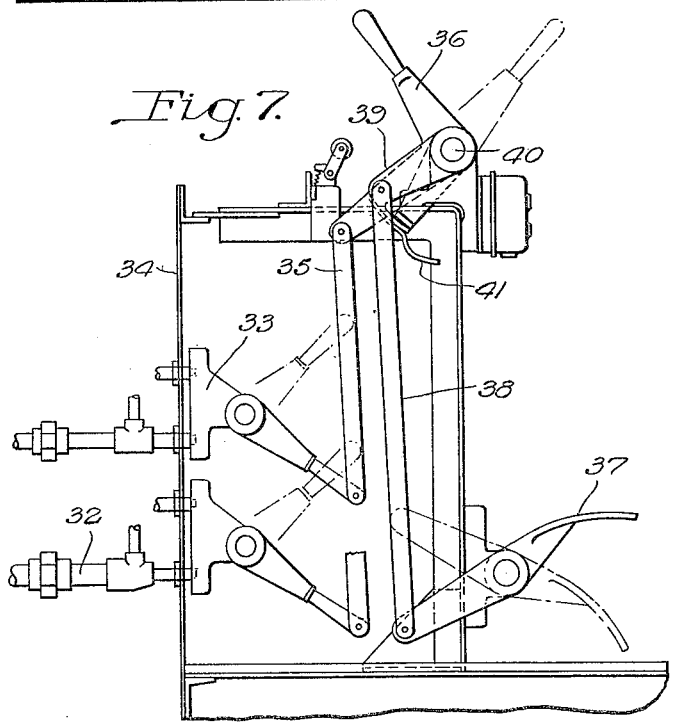

In the accompanying drawings illustrating the present preferred embodiment of the invention, Figure 1 is a transverse section illustrating the essential parts of a car dumper of the lifting and tilting type, Figure 2 is a top plan view of a portion of the platen showing the car retarders, Figure 3 is a side elevation of that portion of the platen illustrated in Fig. 2, Figure 4 is a transverse section to enlarged scale taken on the line IV—IV of Fig. 2, Figure 5 is a transverse section to enlarged scale taken on the line V—V of Fig. 2, Figure 6 is a front elevation of the control mechanism, and Figure 7 is an end view thereof.

The essential parts of the car dumper are illustrated in Fig. 1. The construction of such dumpers is well known and need not be described in detail here. There is provided a stationary frame member 2, a vertically movable cradle 3, and a platen 4 mounted on wheels $4^a$ to permit of lateral movement on the cradle 3. The platen 4 carries tracks 5 for railroad cars C which are to be dumped. Car retarder shoes lie to either side of the rails 5, the inner shoes being indicated at 6 and the outer shoes being indicated at 7.

Figures 2 to 5, inclusive, show the construction of the shoes and their actuating mechanism in detail. The shoes are relatively of short length, they being placed end to end and extending substantially the entire length of the platen. Each shoe is provided at its end with a feather 7' slidable in a hold-down plate 8. Both the inner and the outer shoes are thus made slidable toward and away from the rails 5. The shoes are provided with wear strips 9 which engage the car wheel.

The shoes are normally urged to a fixed position away from the rails by pusher bolts 10, whose heads bear against the web $5^w$ of the rail 5, and which carry compression springs 11. The outward movement is limited by nuts 12 on the ends of the bolts 10. The springs are given sufficient initial compression to insure that when the clamping mechanism is released, the retarder shoes will move to the position of Fig. 5.

Each inner shoe 6 is provided with lugs 13 adjacent each end to accommodate bell cranks 14. The bell cranks are pivotally mounted in the lugs at 15 and have a short arm extending longitudinally of the platen, and a long arm extending transversely thereof. The short arm of each bell crank is pivotally connected to a link bolt 16 extending through an opening 17 in the web of the rail 5 immediately below the head thereof, and further extending through the outer shoes 7. At their outer ends the links 16 are provided with ball nuts 18 engaging cup-like depressions in the shoes 7 and adjustably positioned by jam nuts 19. It will be seen that when the bell cranks are rocked in the proper direction, the shoes 6 and 7 will be caused to move toward one another against the resistance afforded by the springs 11, and that if the rocking motion of the bell crank 14 is continued in a sufficient amount, the car clamps will move inwardly until their motion is limited, as by engaging the wheels of a car. While the compression of the springs 11 will normally cause the clamps 6 and 7 to lie at equal distances from the rails 5, it will be seen that since both clamps are freely movable, the position of a car wheel on the track is of no moment, and that it will ultimately be engaged on both faces by the clamps.

The longer arms of the bell cranks 14 carry links 20 which, in turn, are pivotally connected to equalizers 21. It will be noted that the bell cranks are paired, one bell crank in a pair lying to one side of the platen and the other lying directly opposite thereto. There is an equalizer 21 for each pair.

The equalizers for bell cranks at opposite ends of each clamping unit are pivotally connected by rods 22. One of the equalizers is pivotally connected to an extension 23 of the rod 22 which extension, in turn, is connected to a vertically rockable bell crank lever 24 pivoted in the platen 25. The platen plate 26 is slotted as indicated at 27 so that the arm of the bell crank 24 which connects with the extension 23 may extend upwardly therethrough.

The several bell crank levers 24 are provided with rounded faces 28 at the outer ends of their longer arms so as to engage push rods 29. These push rods are slidably mounted in the cradle 3 and are so positioned therein that when the platen is in car-receiving position, their upper ends lie below the rounded faces of the levers 24.

From the foregoing it will be seen that the only mechanism on the platen is the retarders themselves and the linkage whereby they are actuated. The actuating power is applied through the push rods 29 which are carried by the cradle. The power devices proper are air cylinders 30 which are mounted on the stationary frame 2. When the cradle is in car-receiving position, the piston rods 31 of the air cylinders lie below the push rods 29 and when air pressure is applied at the bottom ends of the cylinders 30, the rods 29 are urged upwardly, thereby acting through the linkage to set the retarders. By reason of the fact that the cylinders are mounted on the stationary frame, there is no necessity for using dangling loops of air hose and the mechanism which must be raised or lowered with the cradle is reduced to a minimum. This effects a material saving in weight and a further saving is effected by reason of the special construction of the retarder shoes. As above described, the links 16 for actuating the shoes extend through openings in the rail just below the head thereof. This makes for a very low twisting moment in the shoes themselves as compared with constructions wherein the power is applied to the shoes beneath the flange of the rail. For example, in a retarder designed to apply 16,000 pounds pressure against the wheel at a point two inches above the top of the rail, the distance from the center of the pull rod to the center of pressure is 5.25 inches, thus giving a torsional moment of 84,000 inch pounds which must be provided for in the design of the castings. If the center line of the pull rod were one inch below the base of the rail, the moment arm would be increased to about 9 inches, and the torsional moment would be 144,000 inch pounds,—an increase of 71%. The pressure on the guide castings would be correspondingly increased, thus requiring much heavier construction. Since the cradle of a car dumper may be hoisted and lowered as many as 70,000 times per year, the savings in weight are of importance.

The air cylinders 30 are supplied with air under pressure through pipes 32 (see Fig. 7) controlled by air valves 33. There must be a number of these air valves to control the several retarders. In a car dumper there may be, say, nine retarder units and those which engage the front truck of the entering car must be independently operable. However, those at the entrance end of the platen will ordinarily be used only on the rear truck and the first three units can therefore be actuated together and from a single air valve. This gives a total of seven valves, which, if mounted in line, would place the first and last handles some four feet apart, making it difficult for an operator to manipulate them readily. In order to reduce this distance and bring the control into small compass, the air valves are mounted on a panel 34 and are staggered as shown in Fig. 6. The handles of the several air valves are connected through links 35 to operating levers 36 which, as shown in Fig. 6, are relatively close together.

In order to quickly move all the valves to the release position, there is provided a foot treadle 37 connected through a link 38 to a lever 39 on a rock shaft 40. The rock shaft 40 carries a resetting arm 41 extending beneath all of the operating levers 36. When the treadle 37 is depressed the resetting arm is rotated clockwise as viewed in Fig. 7, thus moving all of the handles 36 to the release position. A spring 42 returns the treadle 37 to the full line position of Fig. 7.

I have illustrated and described the present preferred embodiment of my invention. It will be understood, however, that it is not limited to the form shown, but may be otherwise embodied within the scope of the following claims.

I claim:—

1. A car dumper comprising a frame, a cradle movable thereon, a platen on the cradle, car-retarding means on said platen, means on said cradle for actuating said retarding means, and stationary means on said frame having abutting engagement with said actuating means for operating said retarder when said cradle is in normal position.

2. A car dumper comprising a frame, a cradle having a car-receiving position on the frame but movable therefrom, a platen on the cradle, a car retarder carried by the platen, and a power device mounted on the frame and so positioned as to operatively engage the car retarding means for actuating the same when the cradle is in a car-receiving position.

3. A car dumper comprising a frame, a cradle having a car receiving position on the frame but movable therefrom, a platen on the cradle movable relative thereto, a car retarder carried by the platen, a power device on the frame for actuating the car retarder, and power transmitting means on the cradle, said means being effective for operatively connecting the power device and the car retarder when the cradle and the platen are in car-receiving position.

4. A car dumper comprising a frame, a cradle having a car-receiving position on the frame but movable therefrom, a platen on the cradle movable relative thereto, a car retarder on the platen, a power device on the frame, and means effective for operatively connecting the power device and the car retarder when the platen is in car-receiving position.

5. A car dumper comprising a frame, a cradle having a car-receiving position on the frame but movable therefrom, a platen on the cradle, a car retarder carried by the platen, an arm rockable in a vertically extending plane, the arm being connected to the car retarder and effective for actuating the same, and power means on the frame adapted to operatively engage the arm when the cradle is in car-receiving position.

6. A car dumper comprising a frame, a cradle movable thereon, a platen on the cradle, car-retarding means on the platen, operating mechanism for said car-retarding means carried on said cradle, and means on said frame engageable with said operating mechanism when said cradle is in normal position, for actuating the operating mechanism.

In testimony whereof I have hereunto set my hand.

ROSS M. BICKLEY.